(12) United States Patent
Yu

(10) Patent No.: US 8,800,942 B2
(45) Date of Patent: Aug. 12, 2014

(54) SUPPORTING APPARATUS FOR ELECTRONIC DEVICE

(75) Inventor: Wen-Hua Yu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 9 days.

(21) Appl. No.: 13/528,026

(22) Filed: Jun. 20, 2012

(65) Prior Publication Data
US 2013/0153721 A1      Jun. 20, 2013

(30) Foreign Application Priority Data
Dec. 16, 2011   (CN) .......................... 2011 1 0422951

(51) Int. Cl.
| F16M 11/00 | (2006.01) |
| F16M 11/14 | (2006.01) |
| F16M 11/10 | (2006.01) |
| F16M 11/12 | (2006.01) |
| F16M 11/20 | (2006.01) |

(52) U.S. Cl.
CPC ............... *F16M 11/10* (2013.01); *F16M 11/12* (2013.01); *F16M 11/2007* (2013.01); *F16M 11/2021* (2013.01); *F16M 2200/021* (2013.01)
USPC ..................................... 248/122.1; 248/183.1

(58) Field of Classification Search
USPC ............... 248/205.5, 205.6, 206.2, 362, 363, 248/122.1, 183.1, 205.7, 181.2, 346.03, 248/346.04, 284.1, 291.1
See application file for complete search history.

(56) References Cited

U.S. PATENT DOCUMENTS

| 5,187,744 | A | * | 2/1993 | Richter ......................... 379/449 |
| 7,380,759 | B1 | * | 6/2008 | Whiteside et al. .......... 248/183.1 |
| D645,033 | S | * | 9/2011 | Quong et al. ................. D14/253 |
| 8,235,334 | B1 | * | 8/2012 | Kobal .......................... 248/122.1 |
| D682,281 | S | * | 5/2013 | Barnard et al. .............. D14/447 |
| 8,487,169 | B2 | * | 7/2013 | Dunlop ........................... 84/329 |
| 2007/0034753 | A1 | * | 2/2007 | Lee ............................... 248/121 |
| 2008/0197250 | A1 | * | 8/2008 | Kaneda et al. ............. 248/206.3 |
| 2012/0175474 | A1 | * | 7/2012 | Barnard et al. ............ 248/122.1 |
| 2013/0009032 | A1 | * | 1/2013 | Polletta et al. ............. 248/440.1 |
| 2013/0153721 | A1 | * | 6/2013 | Yu ............................... 248/205.6 |

\* cited by examiner

*Primary Examiner* — Tan Le
(74) *Attorney, Agent, or Firm* — Novak Druce Connolly Bove + Quigg LLP

(57) ABSTRACT

A supporting apparatus for an electronic device includes a ball joint and a holding mechanism for holding the electronic device. The electronic device is secured in the holding mechanism by spring pressure and is capable of being stably held in different orientations.

10 Claims, 5 Drawing Sheets

SUPPORTING APPARATUS FOR ELECTRONIC DEVICE

BACKGROUND

1. Technical Field

The present disclosure relates to a supporting apparatus for an electronic device.

2. Description of Related Art

Supporting devices, such as docking stations, for handheld electronic devices, such as mobile phones, may be useful. However, most supporting apparatus supports the electronic device in a particular orientation, and the supporting apparatus cannot be used to support the electronic device in another position.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
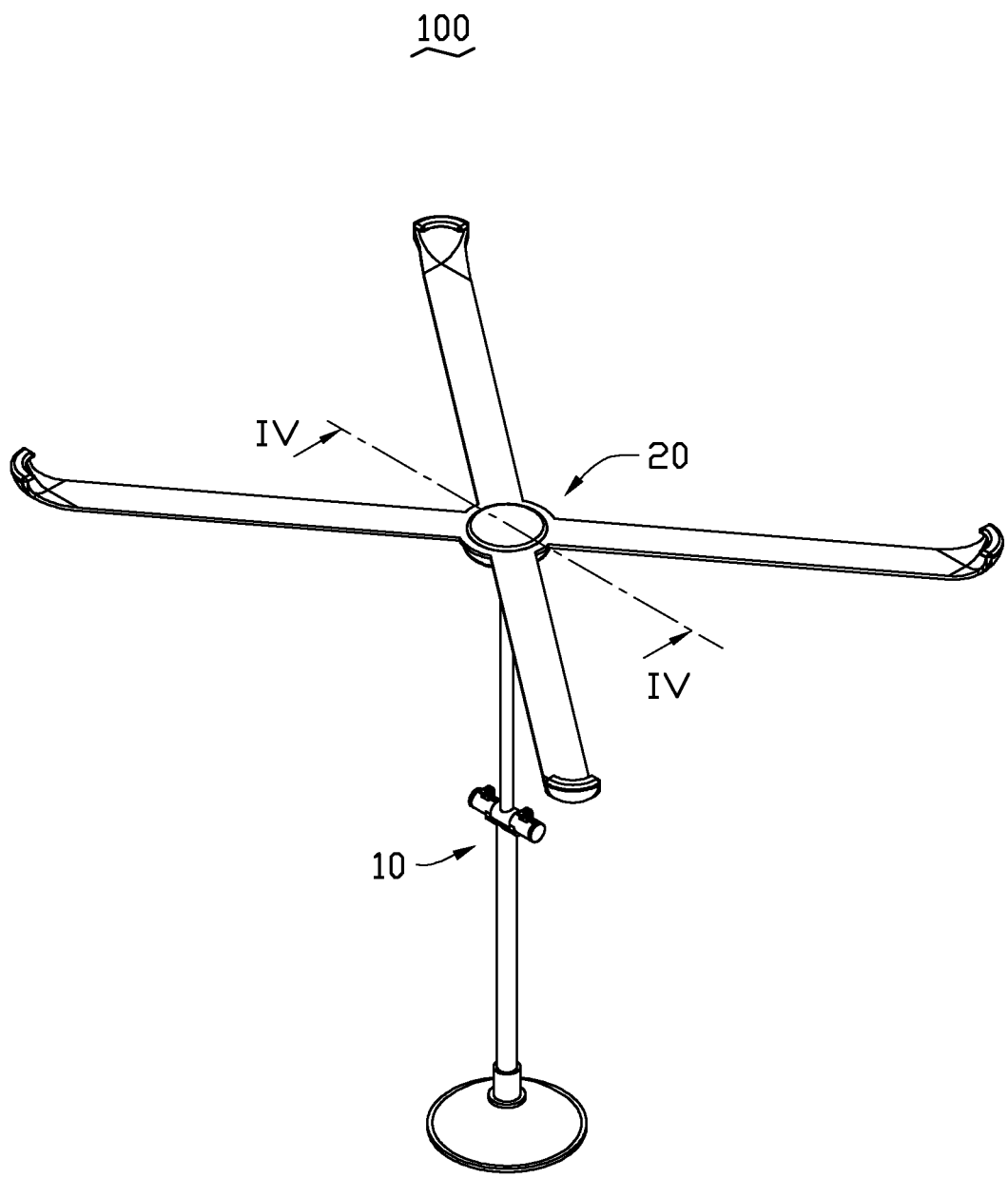
FIG. 1 is an isometric view of a supporting apparatus for supporting an electronic device in accordance with an embodiment.

Referring to FIG. 1, a supporting apparatus 100 for supporting an electronic device 200 (FIG. 5) in accordance with an embodiment is shown. The electronic device 200 may be a cellular phone, a personal digital assistant (PDA), or a media player. The supporting apparatus 100 is capable of supporting the electronic device 200 in different orientations. The supporting apparatus 100 includes a bracket 10 and a holding mechanism 20 rotatably coupled to the bracket 10 and used for holding the electronic device 200.

Figure 2:
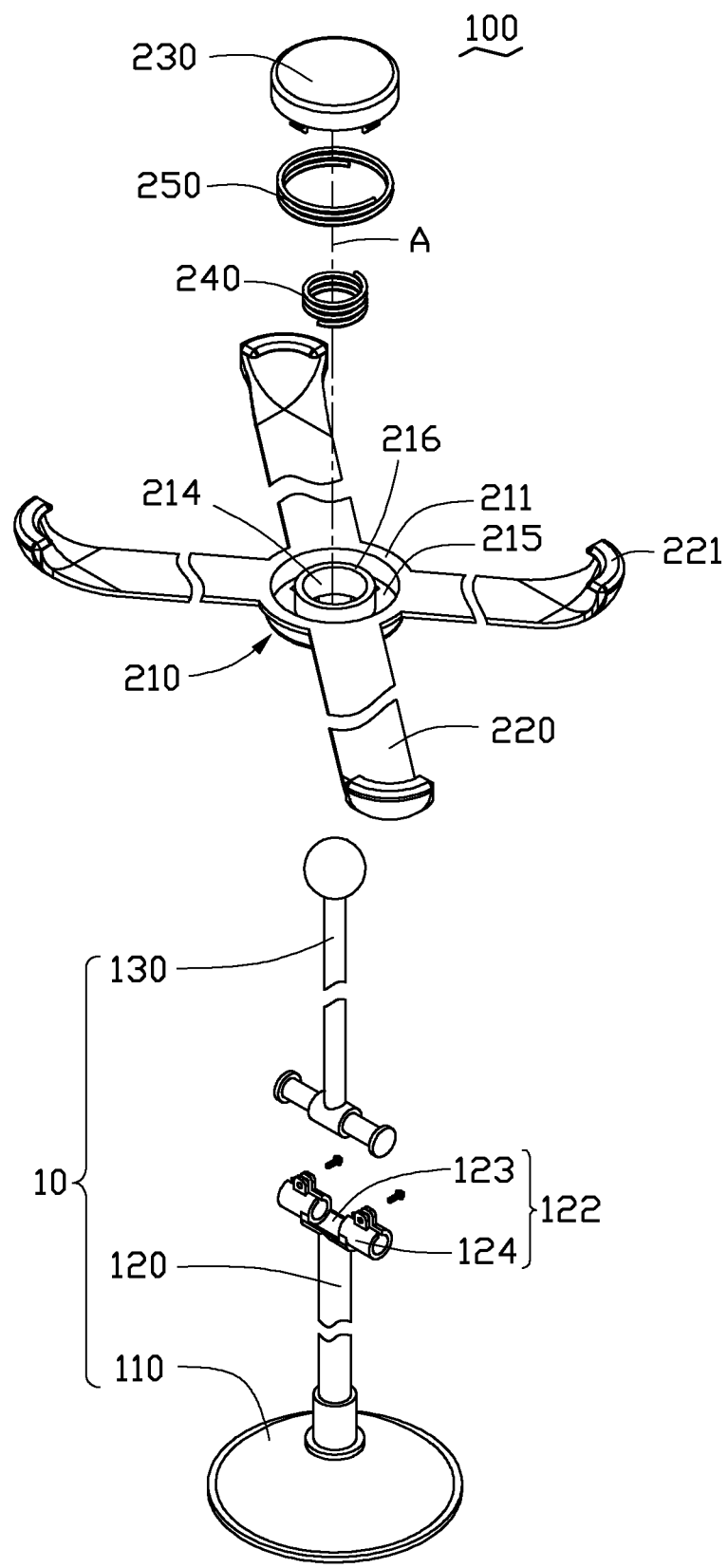
FIG. 2 is a disassembled view of the supporting apparatus of FIG. 1.
Figure 3:
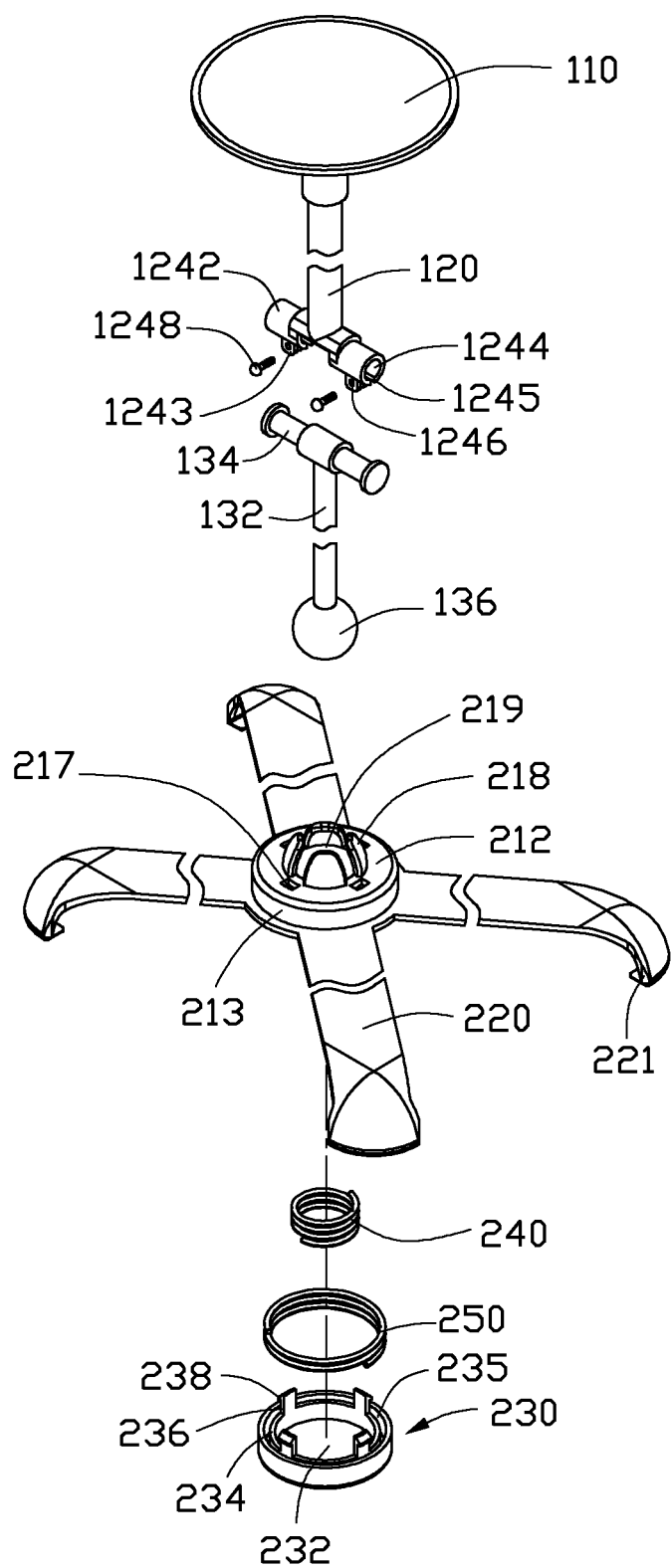
FIG. 3 is similar to FIG. 2, but viewed from another aspect.

Referring to FIGS. 2-3, the bracket 10 includes a base 110, a supporting post 120 fixed to the base 110, and a rotating post 130 pivotally coupled to an end of the supporting post 120 away from the base 110. The base 110 is capable of standing, or being affixed to, a support surface (such as a table, not shown) to support the supporting device 100. In the embodiment, the base 110 is a cup-shaped sucker and is made of rubber. The base 110 is capable of adhering to the support surface by suction.

The supporting post 120 is fixed to the middle of the base 10. A pivoting member 122 is secured to an end of the supporting post 120 away from the base 110. The pivoting member 122 is a type of wrist joint and includes a connecting portion 123 and two sleeves 124. The connecting portion 123 is perpendicularly fixed to the supporting post 120. The sleeves 124 are secured to opposite ends of the connecting portion 123 and are coaxial with each other. Each sleeve 124 includes a hollow cylindrical portion 1242 and two latching members 1243 secured to the cylindrical portion 1242. The cylindrical portion 1242 defines a pivoting hole 1244 extending axially. The cylindrical portion 1242 further defines a clearance 1245 extending in a direction parallel to an axis of the cylindrical portion 1242 and communicating with the pivoting hole 1244. The latching members 1243 are arranged at opposite sides of the clearance 1245 and face each other. The latching members 1243 each define a through hole 1246 used for threadedly receiving fixing members 1248 (such as screws).

The rotating post 130 is pivotally coupled to the pivoting member 122. The rotating post 130 is substantially T-shaped, and includes a connecting post 132, a pivoting rod 134, and a rotating portion 136. The pivoting rod 134 is perpendicularly secured to an end of the connecting post 132. The pivot rod 134 is capable of being rotatably received in the pivoting holes 1244 of the pivoting member 122, such that the rotating post 130 is pivotally coupled to the supporting post 120. The rotating portion 136 is substantially a solid ball, and is secured to the other end of the connecting post 132 opposite to the pivoting rod 134.

The holding mechanism 20 is rotatably connected to the rotating portion 136. The holding mechanism 20 includes a main body 210, four clipping arms 220 secured to the main body 210, and an abutting member 230 movably secured to the main body 210. The main body 210 is substantially disk-shaped. The main body 210 includes a top surface 211, a bottom surface 212 opposite to the top surface 211, and a sidewall 213. The main body 210 defines a receiving hole 214 extending axially. The receiving hole 214 extends through the top and bottom surfaces 211, 212. The diameter of the receiving hole 214 is less than the diameter of the rotating portion 136.

The top surface 211 is recessed to form an annular groove 215 around axis A and surrounding the receiving hole 214. The annular groove 215 is spaced from the receiving hole 214 to form an annular tube 216. The bottom of the annular groove 215 defines four apertures 217. The apertures 217 are evenly spaced from each other.

Four protrusions 218 protrude from the bottom surface 212 of the main body 210. The protrusions 218 are made of elastic material. The protrusions 218 are arranged adjacent to the receiving hole 214. Each protrusion 218 is arranged between two adjacent apertures 217. The protrusions 218 curve toward the axis A of the main body 210 to cooperatively define a receiving space 219. The receiving space 219 communicates with the receiving hole 214, and is used for receiving and grasping the rotating portion 136. In the embodiment, the size of the receiving space 219 is slightly greater than the size of the rotating portion 136, such that the rotating portion 136 is a close fit in the receiving space 219.

The four clipping arms 220 are secured to the sidewall 213 of the main body 210 and extend radially outward from the top surface 201. The clipping arms 220 are made of elastic material. The clipping arms 220 are diagonally arranged in substantially the shape of an X. In the embodiment, ends of the clipping arms 220 represent four vertexes of a rectangle. An end of each clipping arm 220 away from the main body 210 is bent up in a direction opposite to the bottom surface 202 to form a hooking member 221.

The abutting member 230 is substantially disk-shaped, and is coaxial with the main body 210. The depth of the abutting member 230 in the axis A direction is less than the depth of the annular groove 215, and the diameter of the abutting member 230 is slightly less than the diameter of the annular groove 215. The abutting member 230 includes a first end 231 and a second end 233 opposite to the first end 231. The first end 231 is recessed axially to define a substantially circular receiving recess 232. An annular protruding plate 234 is arranged axially at the bottom of the receiving recess 232. The diameter of the annular protruding plate 234 is less than the diameter of the receiving recess 232, such that an annular receiving slot 235 is formed between the protruding plate 234 and the sidewall of the receiving recess 232. The diameter of the protruding plate 234 is slightly greater than the diameter of the annular tube 216. Four elastic fixing arms 236 protrude from an end of the protruding plate 234 away from the bottom wall of the receiving recess 232. The fixing arms 236 are evenly spaced from each other and correspond to the apertures 217. An end of each fixing arm 236 away from the protruding plate 234 is bent radially outward to form a hook 238. The distance between the hook 238 and the axis A is greater than the distance between the apertures 217 and the axis A.

The holding mechanism 20 further includes a first elastic member 240 and a second elastic member 250. The first and second elastic members 240, 250 are spiral springs. The first elastic member 240 is received in the receiving hole 214, and the diameter of the first elastic member 240 is less then the diameter of the receiving hole 214. The second elastic member 250 is received in the receiving slot 235 and sleeves on the protruding plate 234. In the embodiment, the diameter of the second elastic member 250 is slightly greater than the diameter of the protruding plate 234.

Figure 4:
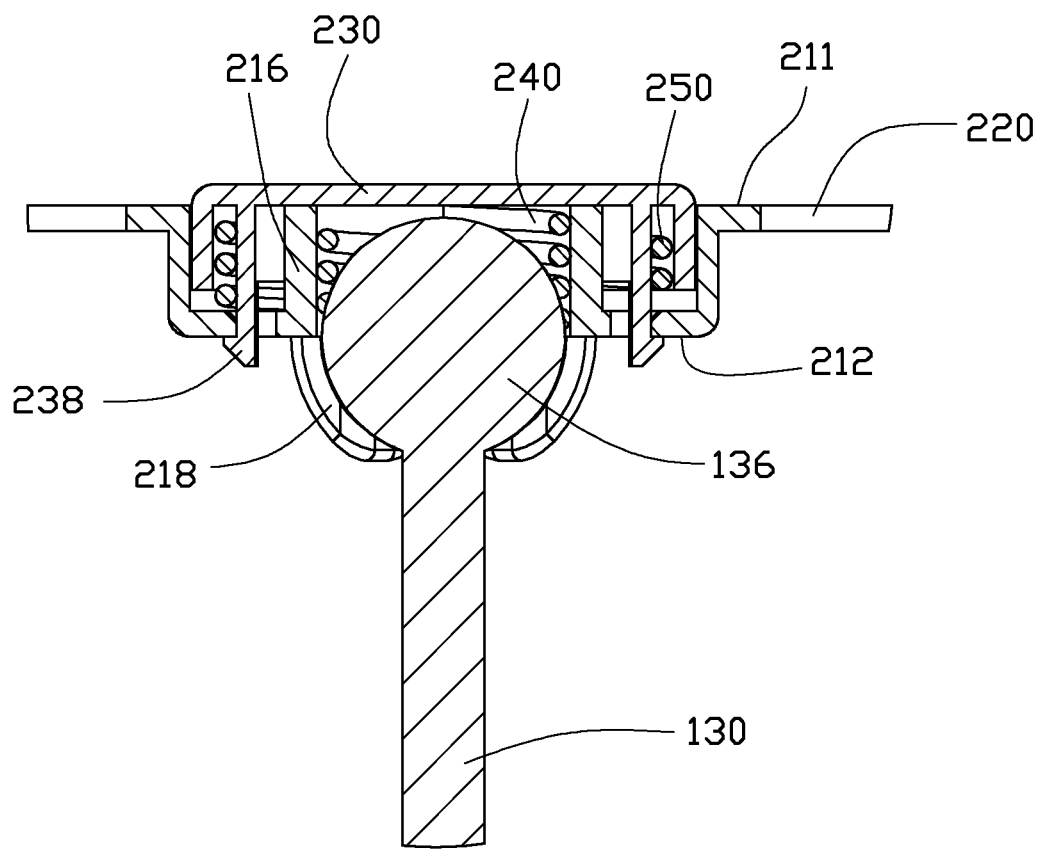
FIG. 4 is a partial cross-sectional view taken along line IV-IV in FIG. 1.

Referring to FIG. 4, in assembly, firstly, the rotating portion 136 deforms the protrusions 218 so as to be received in the receiving space 219. Secondly, the first elastic member 240 is received in the receiving hole 214 and abuts the rotating portion 136. The second elastic member 250 sleeves on the protruding plate 234. Then, the bottom of the receiving recess 232 abuts the first elastic member 240, the fixing arms 236 is operated to pass through the corresponding apertures 217, and the hooks 238 hook the bottom surface 212 of the main body 210, thus, the abutting member 230 is secured to the main body 210. Finally, the pivot rod 134 is rotatably received in the pivoting hole 1244, such that the rotating post 130 is pivotally coupled to the supporting post 120.

After the abutting member 230 is secured to the main body 210, the first and second elastic members 240, 250 are deformed by the pressure of the abutting member 230. The rotating portion 136 is driven to abut the protrusions 218 by the first elastic member 240, thus friction is generated between the protrusions 218 and the rotating portion 136. The protrusions 218 can rotate relative to the main body 210, but the friction between the protrusions 218 and the rotating portion 136 is such that the holding mechanism 20 can be positioned, and is maintained, at any desired orientation. Because opposite ends of the second elastic member 250 abut the bottom of the receiving recess 232 and the bottom of the annular groove 215, and the length of the abutting member 230 is less than the depth of the annular groove 215, the second elastic member 150 under deformation drives the abutting member 230 to protrude out of the top surface 211 of the main body 210 when the abutting member 230 is released.

The supporting device 100 further includes two fixing members 1248 (such as screws, see FIG. 3), the fixing members 1248 is threaded into the through holes 1246. As a result, a rotational friction between the pivoting rod 134 and the sleeves 124 is adjustable by tightening or loosening the fixing members 1248, and the supporting post 120 can be positioned at any desired angle relative to the rotating post 130.

Figure 5:
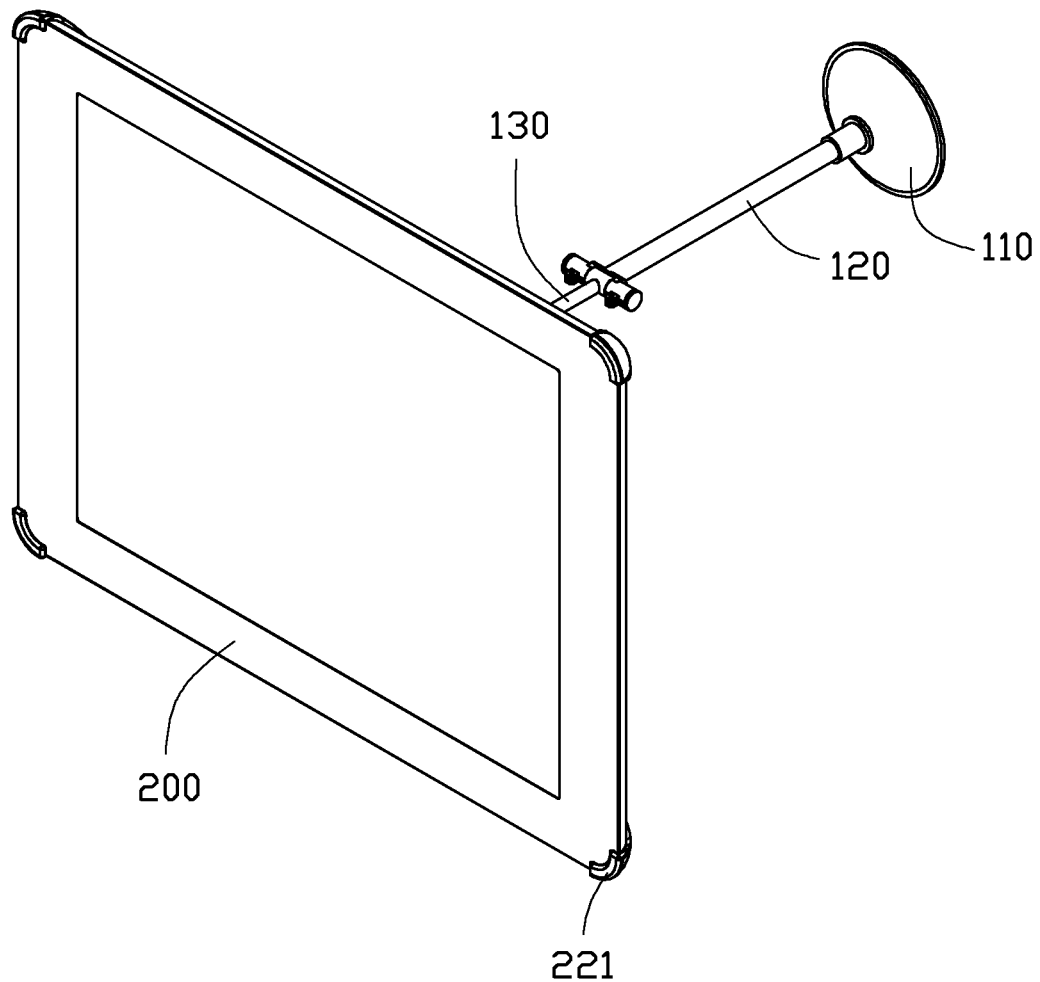
FIG. 5 is an explanatory view showing the supporting apparatus of FIG. 1 when supporting an electronic device.

Referring to FIG. 5, in use, the clipping arms 220 hold the electronic device 200 with the hooking members 221 hooking over the front surface of the electronic device 200. At this time, the rear surface of the electronic device 200 abuts the top surface 211 of the main body 210, and the hooking members 221 cooperatively prevent the electronic device 200 from falling off the supporting device 100. Further, the abutting member 230 protruding out of the top surface 211 pushes against the rear surface of the electronic device 200 against the resistance of the hooking members 221, and the electronic device 200 is thus more firmly secured to the supporting device 100.

After the electronic device 200 is secured to the supporting device 100, the holding mechanism 20 is rotated to adjust the angle of the electronic device 100 relative to the supporting surface, such that the electronic device 200 can be viewed from different angles. Furthermore, by rotating the rotating post 120, users can adjust the height and/or the viewing distance of the electronic device 200.

Even though information and the advantages of the present embodiments have been set forth in the foregoing description, together with details of the structures and functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A supporting apparatus for an electronic device, comprising:
   a bracket having a rotating portion; and
   a holding mechanism for holding the electronic device;
   wherein the holding mechanism is rotatably coupled to the bracket and is capable of rotating around the rotating portion in different orientations; wherein the holding mechanism comprises a main body rotatably coupled to the rotating portion, an abutting member movably secured to the main body, and a plurality of hooking members secured to the main body, the hooking members hook a front surface of the electronic device to hold the electronic device; the abutting member movably protrudes out of the main body to elastically abut the rear surface of the electronic device opposite to the front surface when the electronic device is held to the holding mechanism, and
   wherein the main body defines a receiving hole, a plurality of protrusions protrude from an end of the main body opposite to the hooking members, the protrusions are arranged adjacent to the receiving hole and curves toward the receiving hole to cooperatively define a receiving space, the receiving space communicates with the receiving hole and is used for receiving the rotating portion.

2. The supporting apparatus of claim 1, wherein the holding mechanism further comprises a first elastic member, the first elastic member is received in the receiving hole with opposite ends thereof abutting the abutting member and the rotating portion respectively.

3. The supporting apparatus of claim 1, wherein an end of the main body opposite to the protrusions defines an annular groove surrounding the receiving hole, the annular groove is spaced from the receiving hole to form an annular tube, at least one aperture is defined in the bottom of the annular groove.

4. The supporting apparatus of claim 3, wherein the abutting member is received in the annular groove, at least one fixing arm is secured to the abutting member and corresponding to the at least one aperture, the abutting member is secured to the main body by the at least one fixing arm engaging with the at least one aperture.

5. The supporting apparatus of claim 4, wherein the holding mechanism further comprises a second elastic member, the elastic member is received in the annular groove and abuts the abutting member to make the abutting member protrude out of the main body.

6. A supporting apparatus for an electronic device, comprising:

a bracket having a rotating portion; and a holding mechanism for holding the electronic device;

wherein the holding mechanism is rotatably coupled to the bracket and is capable of rotating around the rotating portion in different orientations; wherein the holding mechanism comprises a main body rotatably coupled to the rotating portion, an abutting member movably secured to the main body, and a plurality of hooking members secured to the main body, the hooking members hook a front surface of the electronic device to hold the electronic device; the abutting member abuts the rear surface of the electronic device opposite to the front surface when the electronic device is held to the holding mechanism; wherein the main body defines a receiving hole, the holding mechanism further comprises a first elastic member, the first elastic member is received in the receiving hole with opposite ends thereof abutting the abutting member and the rotating portion respectively, and wherein the main body further defines an annular groove surrounding the receiving hole, the annular groove is spaced from the receiving hole to form an annular tube, at least one aperture is defined in the bottom of the annular groove.

7. The supporting apparatus of claim 6, wherein the abutting member is received in the annular groove, at least one fixing arm is secured to the abutting member and corresponding to the at least one aperture, the abutting member is secured to the main body by the at least one fixing arm engaging with the at least one aperture.

8. The supporting apparatus of claim 7, wherein the holding mechanism further comprises a second elastic member, the elastic member is received in the annular groove and abuts the abutting member to make the abutting member protrude out of the main body.

9. A supporting apparatus for an electronic device, comprising:

a bracket having a rotating portion; and a holding mechanism for holding the electronic device;

wherein the holding mechanism is rotatably coupled to the bracket and is capable of rotating around the rotating portion in different orientations; wherein the holding mechanism comprises a main body rotatably coupled to the rotating portion, an abutting member movably secured to the main body, and a plurality of hooking members secured to the main body, the hooking members hook a front surface of the electronic device to hold the electronic device; the abutting member abuts the rear surface of the electronic device opposite to the front surface when the electronic device is held to the holding mechanism; wherein the main body defines an annular groove, at least one aperture is defined in the bottom of the annular groove; the abutting member is received in the annular groove, at least one fixing arm is secured to the abutting member and corresponding to the at least one aperture, the abutting member is secured to the main body by the at least one fixing arm engaging with the at least one aperture.

10. The supporting apparatus of claim 9, wherein the holding mechanism further comprises a second elastic member, the elastic member is received in the annular groove and abuts the abutting member to make the abutting member protrude out of the main body.

* * * * *